(12) United States Patent
Pilone

(10) Patent No.: US 11,828,404 B2
(45) Date of Patent: Nov. 28, 2023

(54) PIPE FOR CONVEYING FLUIDS IN HVACR SYSTEMS

(71) Applicant: PTubes, Inc., Honesdale, PA (US)

(72) Inventor: Nicola Pilone, Clarks Green, PA (US)

(73) Assignee: PTUBES, INC., Honesdale, PA (US)

( * ) Notice: Subject to any disclaimer, the term of this patent is extended or adjusted under 35 U.S.C. 154(b) by 101 days.

(21) Appl. No.: 17/397,285

(22) Filed: Aug. 9, 2021

(65) Prior Publication Data

US 2021/0364121 A1    Nov. 25, 2021

(51) Int. Cl.

| | |
|---|---|
| *F16L 59/147* | (2006.01) |
| *B32B 5/18* | (2006.01) |
| *B32B 27/32* | (2006.01) |
| *B29C 48/09* | (2019.01) |
| *B29C 48/21* | (2019.01) |
| *F16L 59/10* | (2006.01) |
| *B32B 1/08* | (2006.01) |
| *B32B 27/06* | (2006.01) |
| *B32B 27/30* | (2006.01) |
| *B29C 63/02* | (2006.01) |
| *F24F 1/34* | (2011.01) |
| *B29K 23/00* | (2006.01) |
| *B29L 23/00* | (2006.01) |
| *B29K 27/06* | (2006.01) |
| *B29K 105/04* | (2006.01) |
| *B29K 105/24* | (2006.01) |

(52) U.S. Cl.
CPC ............ *F16L 59/147* (2013.01); *B29C 48/09* (2019.02); *B29C 48/21* (2019.02); *B29C 63/02* (2013.01); *B32B 1/08* (2013.01); *B32B 5/18* (2013.01); *B32B 27/065* (2013.01); *B32B 27/304* (2013.01); *B32B 27/32* (2013.01); *F16L 59/10* (2013.01); *F24F 1/34* (2013.01); *B29K 2023/0691* (2013.01); *B29K 2023/16* (2013.01); *B29K 2027/06* (2013.01); *B29K 2105/04* (2013.01); *B29K 2105/24* (2013.01); *B29L 2023/225* (2013.01); *B32B 2266/025* (2013.01); *B32B 2307/304* (2013.01); *B32B 2597/00* (2013.01)

(58) Field of Classification Search
CPC . F16L 59/147; F16L 59/10; F24F 1/34; B29C 48/09; B29C 48/21; B29C 63/02; B32B 1/08; B32B 5/18; B32B 27/065; B32B 27/304; B32B 27/32; B32B 2266/025; B32B 2307/304; B32B 2597/00; B29K 2023/0691; B29K 2023/16; B29K 2027/06; B29K 2105/04; B29K 2105/24; B29K 2023/225
See application file for complete search history.

(56) References Cited

U.S. PATENT DOCUMENTS

| 6,782,922 B1 * | 8/2004 | Migliorini ............. F16L 59/023 138/158 |
| 2004/0161562 A1 * | 8/2004 | Graeter .................... B32B 1/08 428/36.1 |
| 2010/0186846 A1 * | 7/2010 | Carlay, II ............ F24F 13/0218 29/700 |

(Continued)

*Primary Examiner* — Craig M Schneider
*Assistant Examiner* — David R Deal
(74) *Attorney, Agent, or Firm* — Tutunjian & Bitetto, P.C.

(57) ABSTRACT

The present invention relates to a composite coating for an inner tube delimiting a passageway for a fluid for obtaining a pipe for conveying fluids in HVACR systems.

6 Claims, 9 Drawing Sheets

(56) References Cited

U.S. PATENT DOCUMENTS

| | | | |
|---|---|---|---|
| 2010/0193061 A1* | 8/2010 | Princell | F16L 59/021 |
| | | | 138/149 |
| 2011/0021651 A1* | 1/2011 | Mayeres | C08K 3/02 |
| | | | 521/85 |
| 2011/0183096 A1* | 7/2011 | Lembo | B29C 65/48 |
| | | | 428/36.5 |

* cited by examiner

PIPE FOR CONVEYING FLUIDS IN HVACR SYSTEMS

TECHNICAL FIELD OF THE INVENTION

The present invention relates to a pipe for conveying fluids, such as liquids or gases in HVACR systems, i.e. in Heating Ventilation Air-Conditioning Refrigeration systems as well as to a composite coating for such a pipe.

The present invention also concerns a method for the obtainment of such pipe and on HVACR systems comprising the same pipe.

BACKGROUND

Pipes that are commonly used in residential or commercial applications for Heating Ventilation Air-Conditioning Refrigeration or HVACR typically require insulation against atmospheric agents which, over time, could reduce the effectiveness of the insulation, thus compromising the properties of the gas or liquid passing through the pipe and, consequently, also affecting the application performance for which the pipe is employed.

Such pipes are for example those referred to by the designation B1003-16 of the ASTM international standard.

The insulation against atmospheric agents for this type of applications is necessary because, often, the pipes are placed outside the operating environment and therefore the are exposed to any weather conditions.

Moreover, good insulation is also necessary to ensure the effectiveness of the liquid or gas passing through the pipe, as occurs for example in air conditioning or heating applications.

It should also be considered that the insulation has even the task of energy savings, since if prevents the heat/cool from being dispersed from the inner tube outwards. In this respect, owing to the weather conditions, the insulation can be damaged, and this would of course determine a reduction of the efficiency in terms of energy savings.

Furthermore, another problem occurring with the insulated pipes is that of the friction or "stickiness" of the outer jacket of the pipe. This friction renders it difficult the installation of the pipe as it lengthens the work of the technician when assembling the pipe.

A further problem with the insulated pipes supplied in accordance with the state of the art is that, often, the material used for the insulation of the pipe is bonded to the external coating without effective binding means and therefore, over time, loosening may occur, which could compromise the effectiveness of the insulating pipe itself.

It is therefore necessary to design and manufacture an insulating pipe which makes it possible to overcome the drawbacks of the known art described above.

SUMMARY OF THE INVENTION

The technical object of the present invention is therefore to improve the state of the art concerning a composite coating for pipes that can be used in HVACR systems.

To achieve this object, the present invention aims at providing a new insulating pipe with improved insulation and a composite coating for such a pipe.

Another object of the present invention is to provide a pipe equipped with an external coating that can be installed or pre-installed in an easy manner.

Still another object of the present invention is to provide an insulating pipe having an outer jacket reliably bonded to inner layers of the pipe.

Finally, another object of the present invention is to provide an insulating pipe that allows an optimal connection between an outer jacket and an insulating cover so as to prevent possible loosening among them.

According to an aspect of the invention, a composite coating according to the present application is provided.

According to an aspect of the invention, an insulating pipe according to the present application is provided.

According to another aspect of the invention, a method of obtaining an insulating pipe is provided, which method makes it possible to obtain such pipe in an easy and rapid manner.

Other aspects of the invention are the use of a pipe according to the present invention for conveying fluids in HVACR systems as well as a new HVACR system.

The present application refers to preferred and advantageous embodiments of the invention.

BRIEF DESCRIPTION OF THE DRAWINGS

Other characteristics and advantages of the invention will be more evident from the description of an embodiment of a pipe according to the present invention and from the description of a method of obtaining such a pipe according to the present invention, illustrated by way of not limitative example in the enclosed drawings in which.

In the accompanying drawings, identical parts or components are indicated by the same reference numbers.

DETAILED DESCRIPTION

Figure 1:
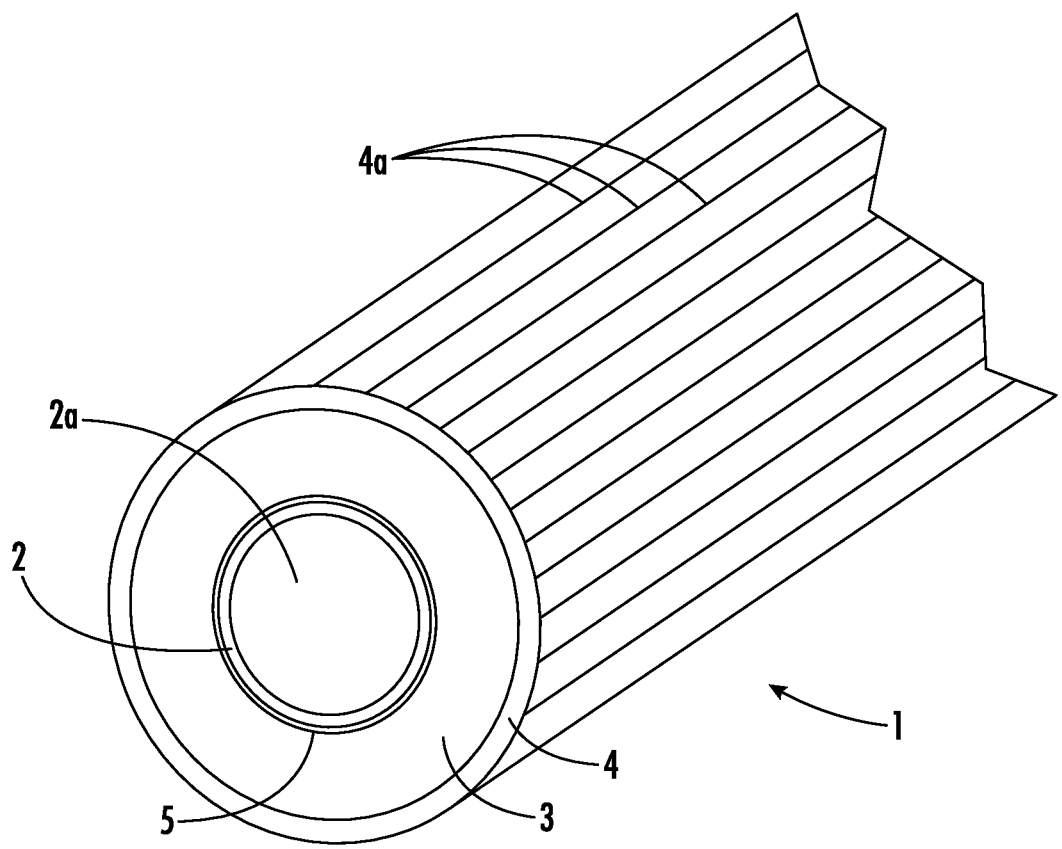
FIG. 1 shows a perspective view of part of a pipe according to the present invention.
Figure 2:
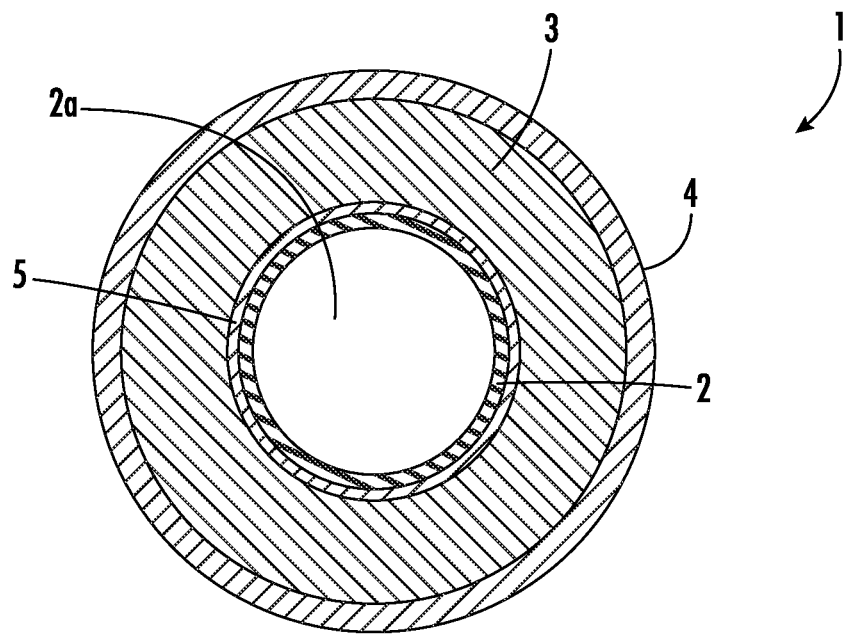
FIG. 2 illustrates a cross-sectional view of the pipe of FIG. 1.

The present invention relates to a pipe 1 for conveying fluids, such as liquids or gases, for example air, in HVACR systems, i.e., in Heating Ventilation Air-Conditioning Refrigeration systems. The fluid to be conveyed through a pipe 1 can be for example a refrigerant in a liquid or gas state.

The pipe 1 comprises an inner tube 2, optionally pre-insulated with the components described below so as to obtain a so called "line set".

Advantageously, a pipe according to the present invention is suitable for connecting the external and internal unit of air conditioning machines. Such pipe can be connected to other pipes or to a component of such machines.

The inner tube 2 delimits an inner space or passageway 2a for the passage or transfer of fluids in HVACR systems.

With the expression "refrigerants" is here to be intended fluids which are conveyed in a cooling or refrigeration circuit, and they, owing to their state change, make it possible to heat or cool other fluids or component of a thermal machine.

As a matter of fact, the inner space or passageway 2a is a channel extending for all the length of the inner tube 2, with an inlet opening at one end and an outlet opening at the other end of the tube 2 or rather of the pipe 1, so that a fluid inserted in the inlet opening of such inner space or passageway 2a is conveyed through the latter until reaching the respective outlet end where the fluid goes into a conditioning equipment, such as a VRF, minisplit, A/C unit, etc.

Such inner tube 2 can be made of metal, such as copper, aluminium or a combination thereof, or is made of plastic or composite material, such as for example copper+plastic (PERT, PE, PEX, PA, etc.), aluminum+plastic ((PERT, PE, PEX, PA, etc.) or stainless steel+plastic (PERT, PE, PEX, PA, etc.).

Moreover, the inner tube 2 has a thickness ranging for example between 0.4 mm and 1.5 mm.

The inner tube 2 is fluid tight and not porous, for example liquid and/or gas tight, since it should prevent the leakage of fluid through its wall/s. In this respect, the sole openings delimited by the inner tube 2 are at the ends of the latter.

The outer cross section of the inner tube 2 can be suitably shaped, for example it has a regular polygonal, irregular polygonal, circular or oval or round cross-section. This means that at least the outer cross section of the inner tube 2 has the mentioned shape, considering that "outer" in the present invention means the area opposite the innermost area of the pipe. The innermost area of the pipe can correspond to the inner space or passageway 2a defined by the inner tube 2, although an inner liner for the same can be provided. Of course, even the inner cross-section of the inner tube 2 can have a regular polygonal, irregular polygonal or circular or oval or round cross-section or any other suitable cross-section.

The pipe 1 further includes a tubular insulating cover 3 covering or enclosing the inner tube 2, which cover is made of an insulation material. Preferably, the insulation material is a foam insulation material, i.e. a material undergoing an expansion under given conditions (temperature, pressure, etc.) until obtaining the final tubular shape. Optionally, the foam insulation material has a closed-cell structure.

The tubular insulating cover 3 covers or encloses the inner tube 2 for the whole length or longitudinal extension of the latter.

The sole (circular or with another shape) openings delimited by the tubular insulating cover 3 are at the ends of the latter.

Such insulation material comprises or consists of cross-linked polyethylene. In the present patent document, the verb "consists" means "includes only", whereas this is not the case of the verb comprise or include.

Moreover, the tubular insulating cover 3 has a thickness ranging for example between ½ in and 1 in. Preferably, the thickness of the tubular insulating cover 3 is constant from one end to the other of the cover 3.

The tubular insulating cover 3 is bonded or constrained, optionally with glue to the inner tube 2 or to an intermediate tubular layer arranged between the tube 2 and the cover 3.

The tubular insulating cover 3 or rather an inner surface of the same can be in contact, preferably continuously or with no discontinuity and for its whole extension, with an outer surface of the tube 2 or, as alternative with an outer surface of an intermediate layer, such as for example a tubular layer arranged between the tube 2 and the cover 3.

Advantageously, no gap is provided among the inner tube 2 and the insulating cover 3.

The inner and outer cross sections of the cover 3 can be suitably shaped, for example one or both of them (inner and outer cross sections) can have a regular polygonal, irregular polygonal or circular or oval or round cross-section. Preferably, the shape and size of inner cross-section of the cover substantially corresponds to or rather are slightly higher than the shape and size of the outer cross-section of the inner tube 2.

The insulating cover 3 has the function of protecting the inner tube 2. Furthermore, it ensures, in addition to good insulation, resistance to hydrolysis (resistance to hot water and steam), resistance to UV radiation even if the respective production costs are low.

The pipe 1 includes even a tubular jacket 4 coating the tubular insulating cover 3, which tubular jacket 4 is made of at least one thermoplastic elastomer.

The tubular jacket 4 is preferably bonded or constrained, optionally with glue, to the tubular insulating cover 3 or to an intermediate layer.

To this regard, the bond or constrain among the layers 2 and 3 can also be obtained owing to the knurling described below.

In this respect, the jacket 4 or rather an inner surface of the same can be in contact, preferably continuously or with no discontinuity and for its whole extension, with an outer surface of the cover 3 or, as alternative with an outer surface of a tubular intermediate layer arranged between the cover 3 and the jacket 4.

Preferably, the tubular jacket 4 is made of a mixture of at least one thermoplastic elastomer and of ethylene-propylene-diene-monomer (EPDM). In addition or alternative, the tubular jacket 4 is made of polyethylene (PE), PVC or a mixture of elastomers and polymers.

If desired, the material for the obtainment of the tubular jacket contains at least one suitable additive, such as for example UV or weather retardants, slipping agents, fire or smoke retardants, anti-microbial agents, colors, etc.

The jacket 4 could be the outermost layer of the pipe 1.

Moreover, the jacket 4 has a thickness ranging for example between 0.2 mm and 2 mm. Preferably, the thickness of the jacket 4 is constant from one end to the other thereof.

The protective jacket 4 acts as protective sheath, since it provides resistance to bending, even at very low temperatures, as well as good resistance to abrasion.

The sole (circular or with another shape) openings delimited by the tubular insulating cover 3 are at the ends of the latter.

Preferably, the insulating cover 3 comprises or consists of two tubular layers or sheets 3 applied one over or around the other, each layer or sheet having a thickness ranging among 5 and 15 mm or rather among 6 and 13 mm, so that the final insulating cover 3 has a whole thickness ranging among 10 and 30 mm or rather among 12 and 26 mm.

In this respect, the cross-linked polyethylene is produced in sheet only, owing to a molding or sheeting process.

Moreover, the pipes for HVACR, especially those to be used in the USA market, should have a high thickness, usually ranging among 12 and 26 mm, and thus a problem of obtaining from a sheet a tubular component with such a thickness occurs.

Thus, in general the insulation cover can be obtained arranging two layers or sheets made of cross-linked polyethylene, each layer or sheet having a thickness ranging among 5 and 15 mm, and obtaining a two-layers tubular insulating cover by contacting and folding such layers or sheets one over or around the other.

Figure 14:
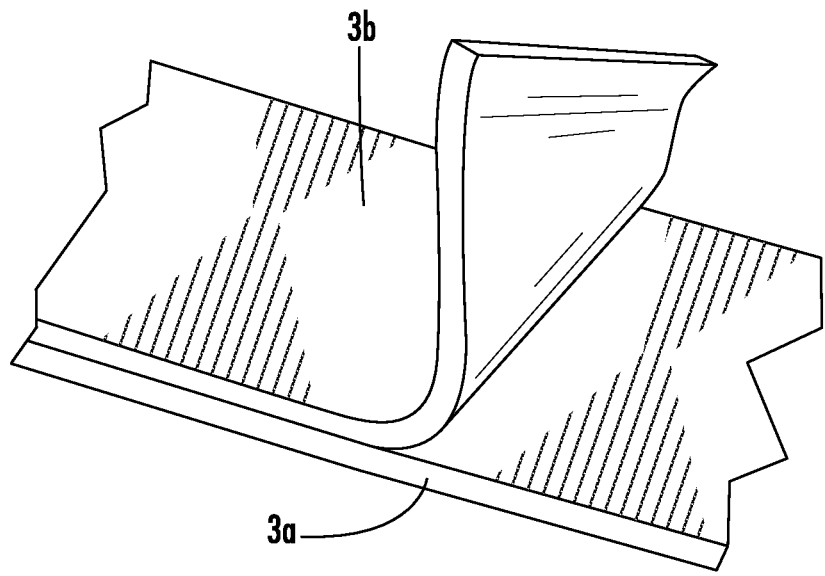
FIGS. 14 to 17 show alternatives for obtaining a tubular insulating cover for a pipe according to the present invention.

In accordance with a first process of the invention for obtaining a tubular insulating cover made of cross-linked polyethylene (see FIG. 14), two sheets 3a, 3b of cross-linked polyethylene each with a thickness ranging among 5 and 15 mm or rather among 6 and 13 mm and with substantially the same length and width are obtained. Of course, three or more sheets can be also used for obtaining a cover.

In this respect, the sheets are obtained and then optionally stripped (i.e. cut in strips), coiled and uncoiled. If desired, the second or outer sheet can be outercoated or rather jacketed, i.e. provided with the jacket, as will be better indicated below.

At a later stage, the same sheets 3a, 3b are abutted at a respective face and bonded to one another, optionally with glue or adhesive or welding and such bonded layers are folded and then glued or welding at their free ends, so as to obtain a two-layers tubular insulating foam component 3, which can be coiled or boxed before the other steps of the method.

Figure 15:
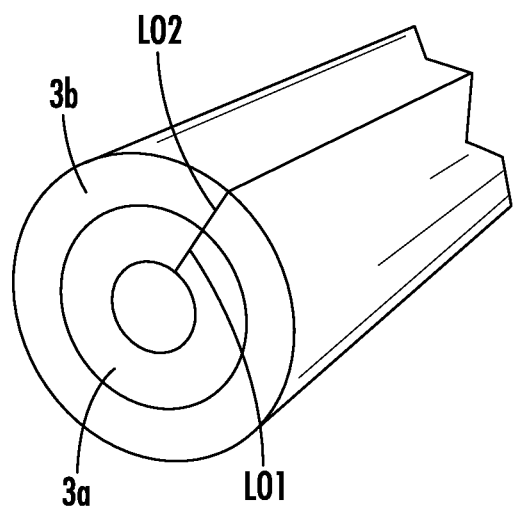

As an alternative (see FIG. 15), one sheet 3a of cross-linked polyethylene with a thickness ranging among 5 and 15 mm or rather among 6 and 13 mm is folded so as to obtain a tubular component and a second sheet 3b of cross-linked polyethylene with a thickness ranging among 5 and 15 mm or rather among 6 and 13 mm and with width and length substantially corresponding to the first sheet 3a is folded around such first tubular component 3a, in such a way that the longitudinal opening LO1 defined among the free edges of the first folded sheet 3a is aligned to the longitudinal opening LO2 defined among the free edges of the other folded sheet 3b. In this respect, at this stage a first free edge of the first sheet 3a is substantially aligned to a first free edge of the second sheet 3b and a second free edge of the first sheet 3a is substantially aligned to a second free edge of the second sheet 3b.

Subsequently, the free ends of each sheet 3a, 3b are glued or welded to one another, thereby obtaining a two-layers tubular insulating foam component 3, which can be coiled or boxed before the other steps of the method.

Figure 16:
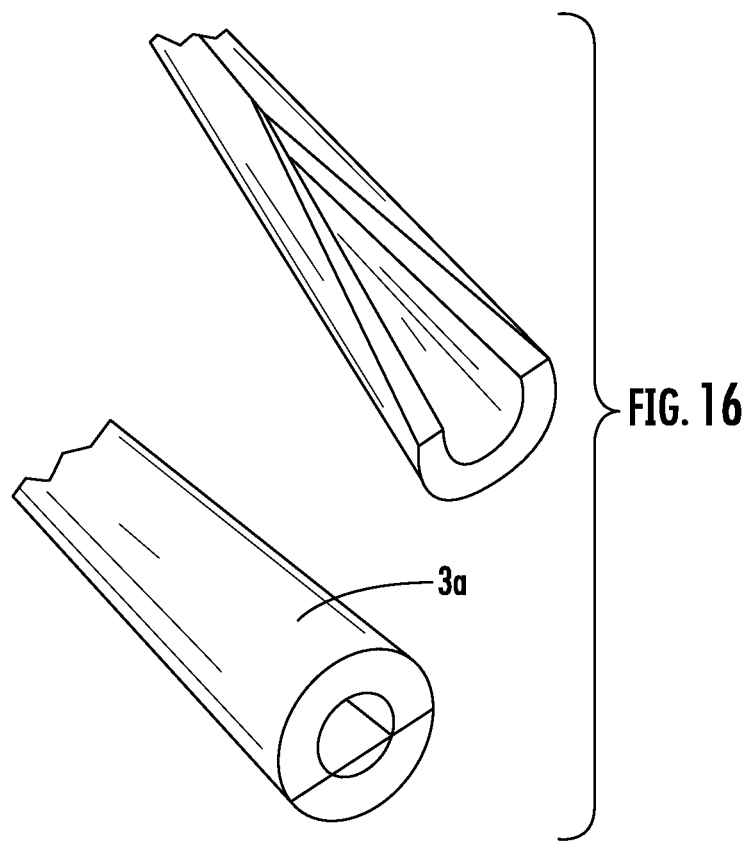
Figure 17:
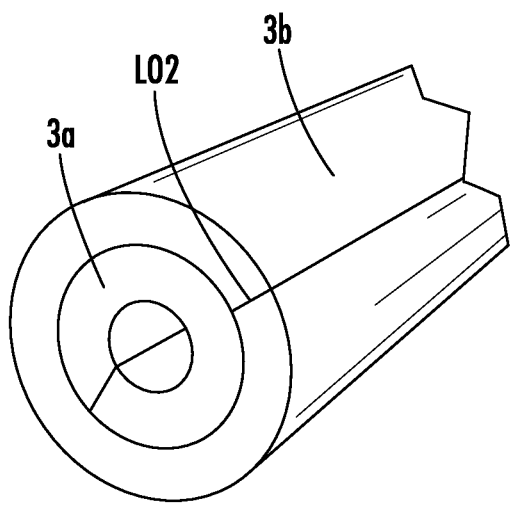

According to a third alternative (see FIGS. 16 and 17), one sheet 3a of cross-linked polyethylene with a thickness ranging among 5 and 15 mm or rather among 6 and 13 mm is folded to obtain a tubular component and it is glued or welded at its free ends, so as to form a one-layer tubular insulating foam component.

At a later stage, a second sheet 3b of cross-linked polyethylene with a thickness ranging among 5 and 15 mm or rather among 6 and 13 mm and with substantially the same length and width of the first sheet 3a is folded around such first tubular component, in such a way that the longitudinal opening LO2 defined among the free edges of the second sheet 3b is preferably not aligned to the longitudinal glued or welded zone defined at the glued or welded free edges of the first sheet 3a. Of course, also the free ends of the second sheet 3b are subsequently glued or welded, so as to obtain a two-layers tubular insulating foam component 3, which can be coiled or boxed before the other steps of the method.

Even in this case, if desired, the second or outer sheet 3b can be outercoated.

According to another alternative, the sheets 3a, 3b of the cover 3 are applied one after the other over and around the inner tube 2.

More particularly, in such case a first sheet 3a as above indicated is obtained and then optionally stripped, coiled and uncoiled and then the same is folded or applied around an inner tube 2. At this point, the ends of the first sheet 3a are glued or welded, so as to obtain a one-layer tubular insulating foam component around the inner tube 2.

The second sheet 2b instead is obtained, optionally stripped, coiled and uncoiled and then the inner tube 2 plus the first tubular sheet 3a is inserted inside the tubular second sheet 3b or the second sheet 3b is folded or applied around the first tubular sheet 3a previously applied around the inner tube 2, and then the ends of the second sheet 3b are glued or welded, so as to obtain a two-layers tubular insulating foam component around the inner tube 2. The protective jacket 4 can be not porous and fluid tight, although its main role is not that of preventing the leakage of fluid through its walls.

The inner and outer cross sections of the protective jacket 4 can be suitably shaped, for example one or both of them (inner and outer cross sections) can have a regular polygonal, irregular polygonal or circular or oval or round cross-section. Preferably, the shape and size of inner cross-section of the jacket 4 substantially corresponds or are slightly higher than the shape and size of the outer cross-section of the cover 3.

Advantageously, no glue or adhesive is provided between the tubular jacket 4 and the tubular insulating cover 3, since the same layers are constrained or connected or bonded to one another owing to the features of the obtainment step of the tubular jacket 4 over or around the tubular insulating cover 3 and not by glue or adhesive.

As it will be understood, all the layers 2, 3, 4 and, if provided, 5 have a tubular shape, for example with circular cross-section or with a different cross-section as stated above. In this respect, the layers 3, 4 and 5 are—directly or indirectly—placed or applied over or around the outer surface of the inner tube 2 and thus they have a shape substantially corresponding to the latter.

According to an embodiment of the invention, the pipe 1 is a flexible pipe, so that the same can be wound on a reel or the like and bent for transportation and installation needs. Furthermore, as disclosed above, the pipe 1 is a composite pipe, as it comprises an inner tube 2 delimiting an inner space or passageway 2a for conveying the fluid (liquid or gas) through the pipe 1, and further includes at least two coatings 3, 4 applied over or around the tube 2, in succession one after the other, from the tube 2 outwards.

Although in the foregoing a pipe 1 was mainly described, the present invention event relates to a composite coating for an inner tube delimiting a passageway for a fluid for obtaining a pipe for conveying fluids in HVACR systems, which composite coating comprises a tubular insulating cover 3 and a tubular jacket 4 and does not include an inner tube 2, even if it is designed to be connected or coupled to an inner tube 2.

In this respect, as will be also described below, a composite coating including the tubular insulating cover 3 and the tubular jacket 4 can be obtained before the insertion step of the inner tube 2 and thus the same coating is to be considered as a unit separated from the latter.

According to the present invention a method of obtaining a pipe for conveying fluids in HVACR systems 1 is also provided, which can be carried out in a specific production line 6 including subsequent stations.

Figure 3:
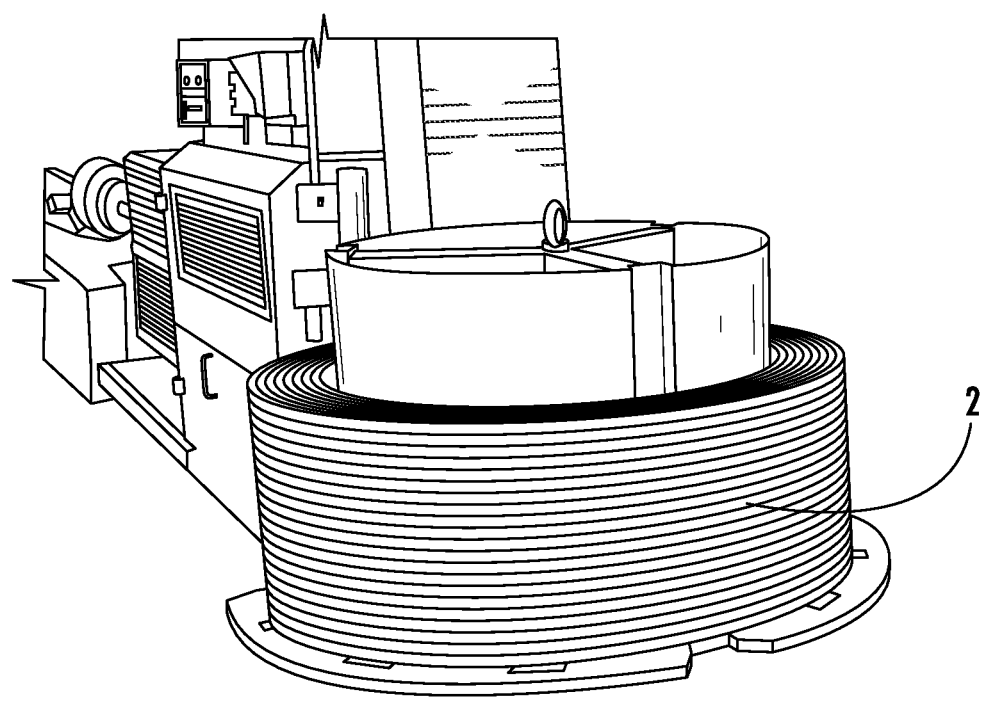
FIGS. 3-13 show each a respective step of a method for obtaining a pipe according to the present invention.
Figure 4:
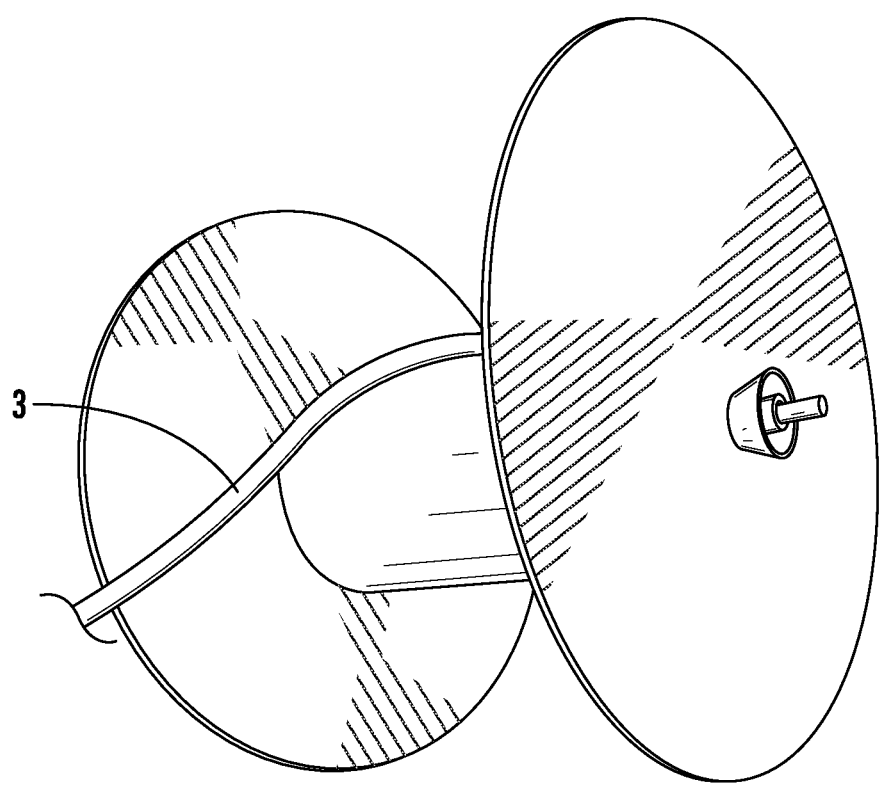
Figure 5:
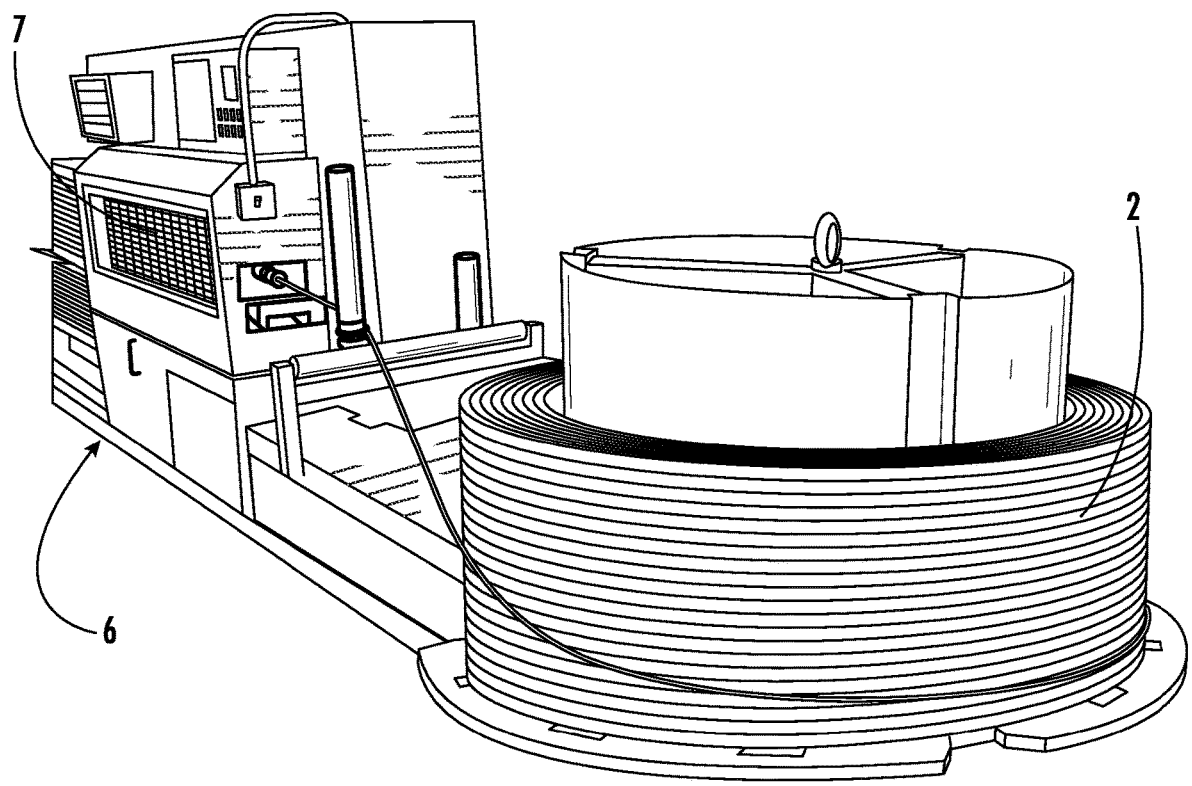

Such method comprises the following steps:
providing an inner tube 2 (this method step is for example shown in FIG. 3), for example unwinding it from a respective reel and then, if needed, straightening it,
providing a tubular insulating cover 3 (this method step is for example shown in FIG. 4), for example unwinding it from a respective reel or obtaining it from a respective container, or providing one or more sheets 3a, 3b of insulating cover 3, and
inserting the inner tube 2, optionally coated with an intermediate layer 5, inside the insulating cover 3 or applying the tubular insulating cover 3 or folding or applying one or more (one after the other as above indicated) respective sheets 3*a*, 3*b* around the inner tube 2, and if needed, welding or gluing the ends of the sheets 3*a*, 3*b* so as to obtain a one-layer tubular insulating foam component or two-layers tubular insulating foam component around the inner tube 2.

So far as the method is concerned, the insulation material preferably comprises or consists of cross-linked polyethylene, although the same can be made even of other materials or compositions of material not including cross-linked polyethylene, for example polyethylene (not cross-linked), polypropylene, cross-linked polypropylene, rubber, such as PVC/NBR rubber, EPDM rubber, polyurethane, rock wool, glass wool and/or aerogel.

Of course, means of guiding the inner tube 2 and the insulating cover 3 as well as the other components for obtaining a pipe along the line are provided in the latter.

The insulating cover 3 can be obtained by extrusion and/or vulcanization and/or polymerization of a respective insulation material.

So far as the steps for obtaining a two-layers tubular insulating foam are concerned, reference to the above-mentioned alternatives should be made.

Preferably, the step of applying the tubular insulating cover 3 around the inner tube 2 comprises:
- longitudinally cutting, for example through a suitable saw 8, such as a circular saw, the tubular insulating cover 3, thereby defining a longitudinal through slit 3*a* therein or obtaining the tubular insulating cover 3 with a longitudinal through slit formed in the respective side wall,
- inserting the inner tube 2 in the slit 3*a* of the insulating cover 3 and thus inside the longitudinal opening of the latter,
- closing the slit 3*a* by welding, for example by hot air or UV rays or by glue.

Figure 6:
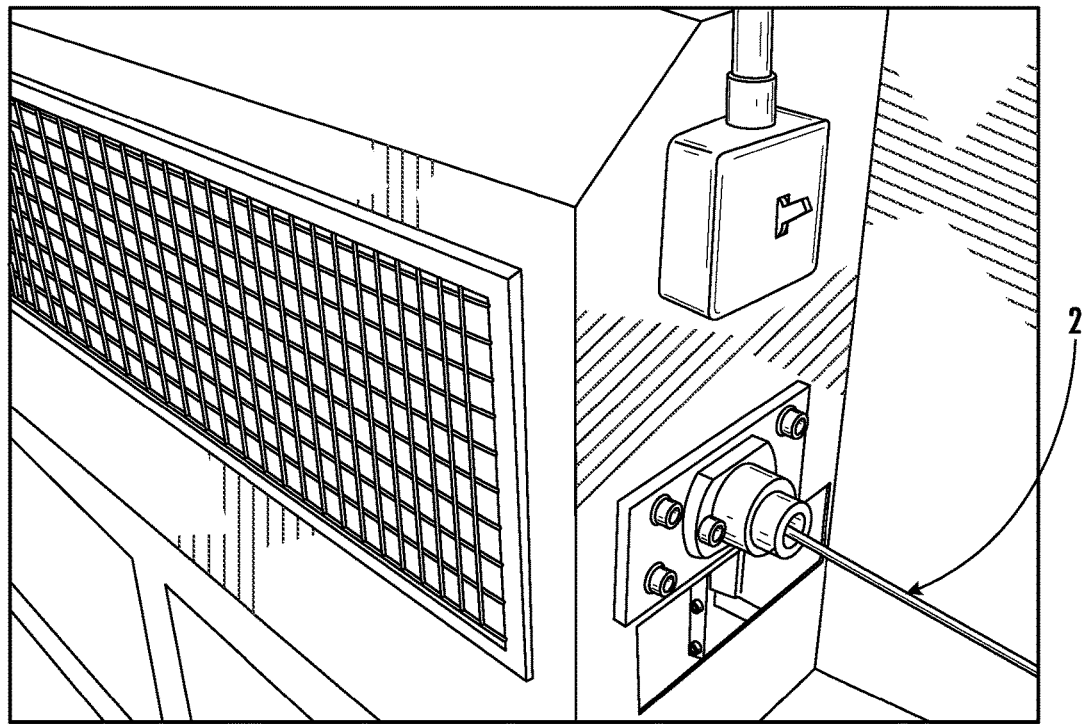
Figure 7:
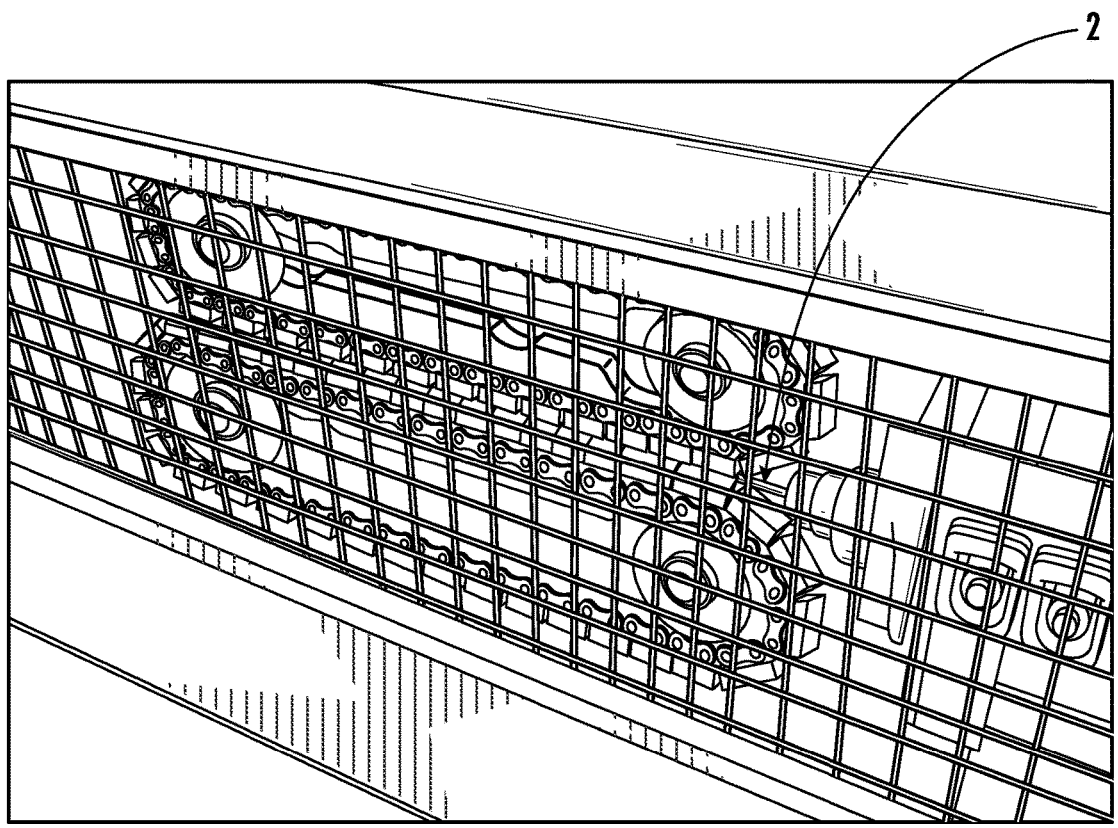
Figure 8:
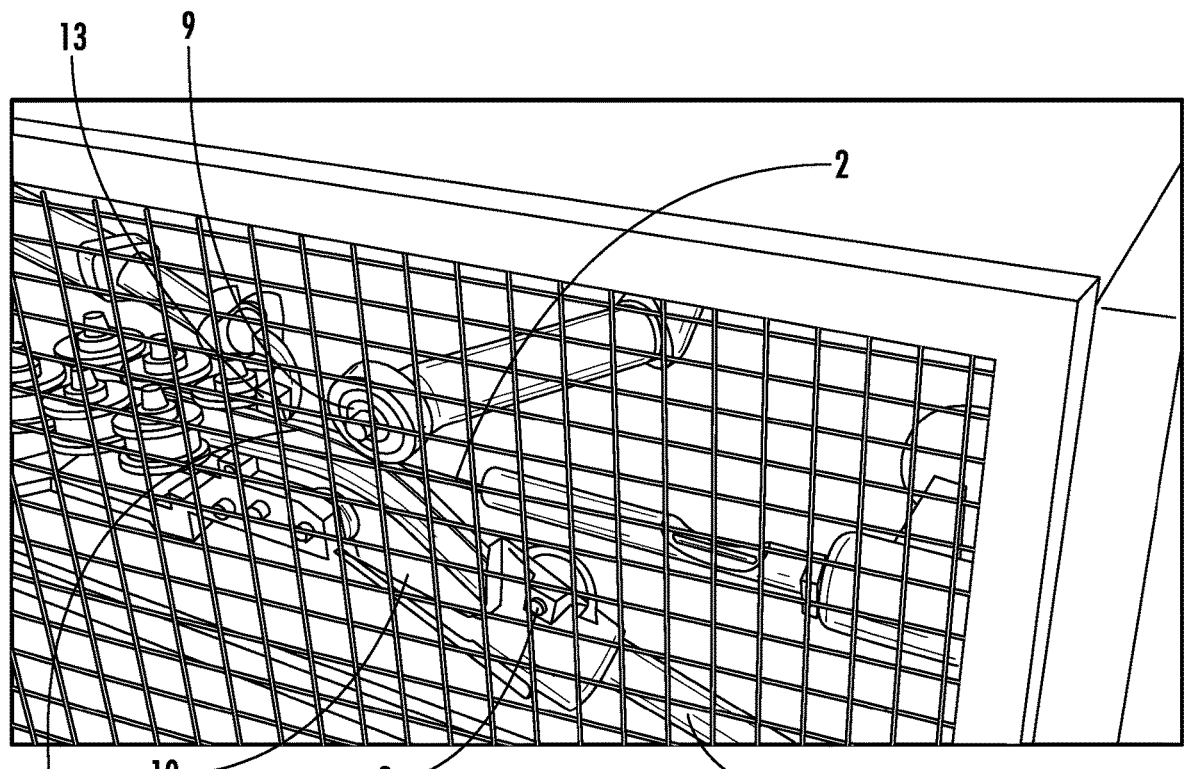

FIGS. 6 to 8 show such method steps, wherein the inner tube 2 is fed to a coating machine 7 of the line 6 which forces the inner tube 2 along a predetermined pathway, according to which (as shown in FIG. 7) the inner tube 2 is drawn close to the insulating cover 3, which component is also caused to advance, and the inner tube 2 is guided through the slit 3*a* of the insulating cover 3, so as to enter the longitudinal opening of the insulating cover 3.

Optionally, enhancing means 9 will enhance or improve the insertion of the inner tube 2 inside the slit 3*a* by enlarging the latter. The enhancing means can include a roller or rotating bearing 9 and/or a wedge. In particular, the roller or rotating bearing 9 or wedge of the enhancing means can include an end or portion suitable to be inserted inside the slit 3*a*, so that such roller or rotating bearing or wedge enlarges a respective portion of the slit 3*a*, while the respective insulating cover 3 is made to advance in the line 6, thereby rendering it possible for the tube 2 to enter the same slit 3*a*.

Advantageously, the insulating cover 3 guided through the line 6 for obtaining a pipe 1, is bent by bending means, for example including rollers 10 or the like, at the station of the line 6 where the tube 2 is inserted into the cover 3.

In this respect, owing to the action of the bending means, the cover 3 advancing in the line 6 is caused to deviate from a first direction, for example inclined with respect to the horizontal to a second direction, for example horizontal, inclined with respect to the first direction, for example by an angle ranging among 20° and 80°.

In such case, the tube 2, is drawn along a direction substantially parallel to the second direction, at least at the station of the line 6 where the tube 2 is inserted into the cover 3, and it (the tube 2) is inserted through the slit 3*a* at the point or portion of the line where the deviation of the cover 3 occurs.

As it will be understood, the deviation optionally imparted on the cover 3, in combination with the guiding direction of the tube 2 with the optional proviso of enhancing means 9, determines an easy and rapid insertion of the inner tube 2 inside the cover 3.

If the insulating cover 3 is to be cut and not directly obtained or in any case previously provided with a slit, a suitable cutter or a saw 8 can be provided in the line 6, preferably upstream of the optional enhancing means 9*a*, 9*b* and/or of the means for deviating the cover 3. Moreover, the cutter 8 has for example the shape of a rotating or fixed blade able to obtain the through slit 3*a* in the cover 3. Obviously, the cutter has a predetermined size, suitable for cutting the whole thickness of the wall of the insulating cover 3.

In this respect, the slit 3*a* has a depth corresponding to the thickness of the insulating cover 3, from the outermost surface thereof till its inner hole or cavity.

Figure 9:
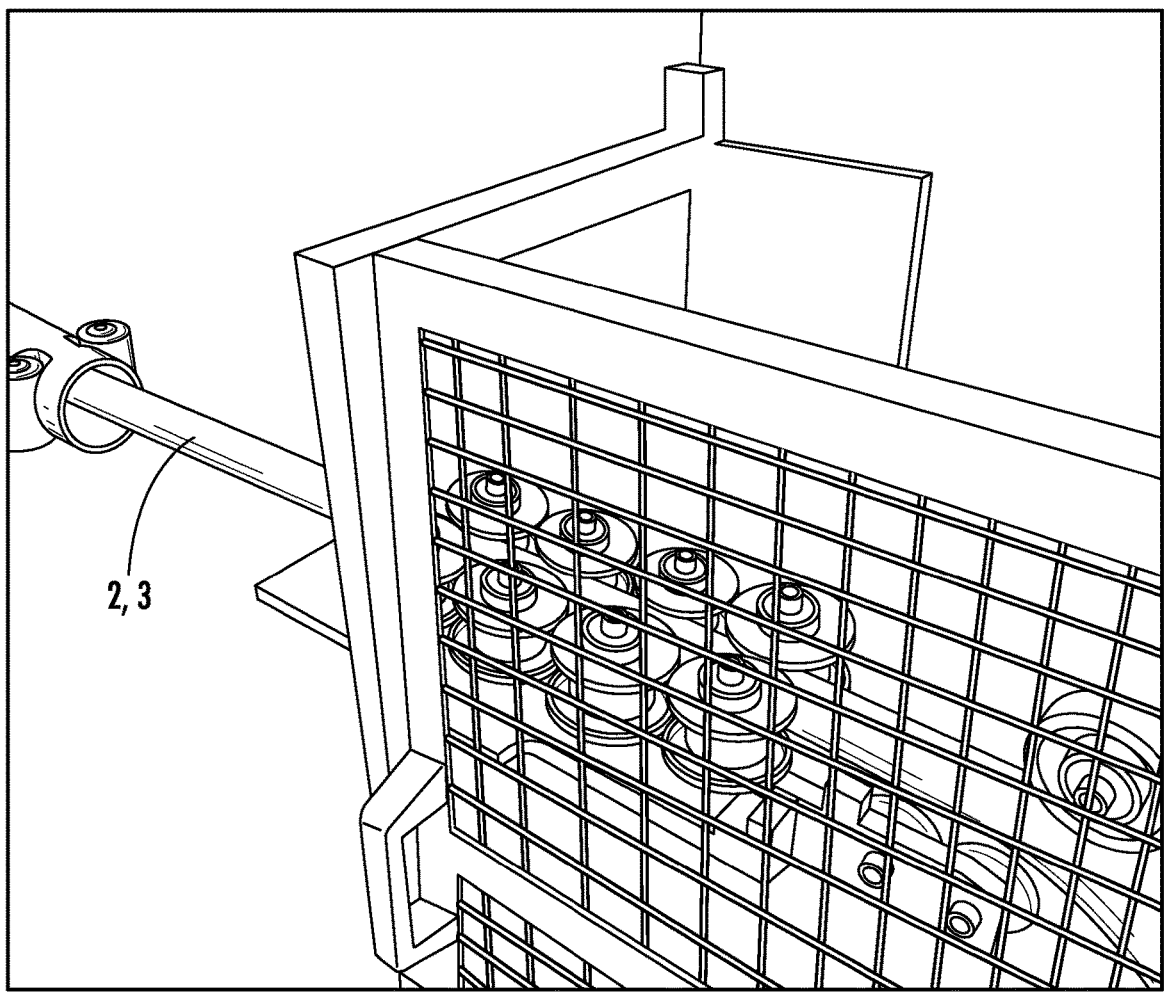

As shown in FIG. 9, after the inner tube 2, optionally coated with an intermediate layer 5, has been inserted inside the insulating cover 3, a step of closing the slit 3*a* is provided. As already indicated, such closing step can be performed by welding for example by hot air or UV rays or gluing with a suitable nozzle 13 the insulating cover 3 at the slit 3*a*.

As an alternative, the cover 3 is provided with a slit, and with an adhesive layer suitably covered by a non-adhesive layer arranged at the edges of the cover 3 delimiting the slit; in such case, after the inner tube 2 has been inserted into the cover through the slit the non-adhesive layer is removed so that the adhesive layers will adhere to each other closing the slit.

Figure 10:
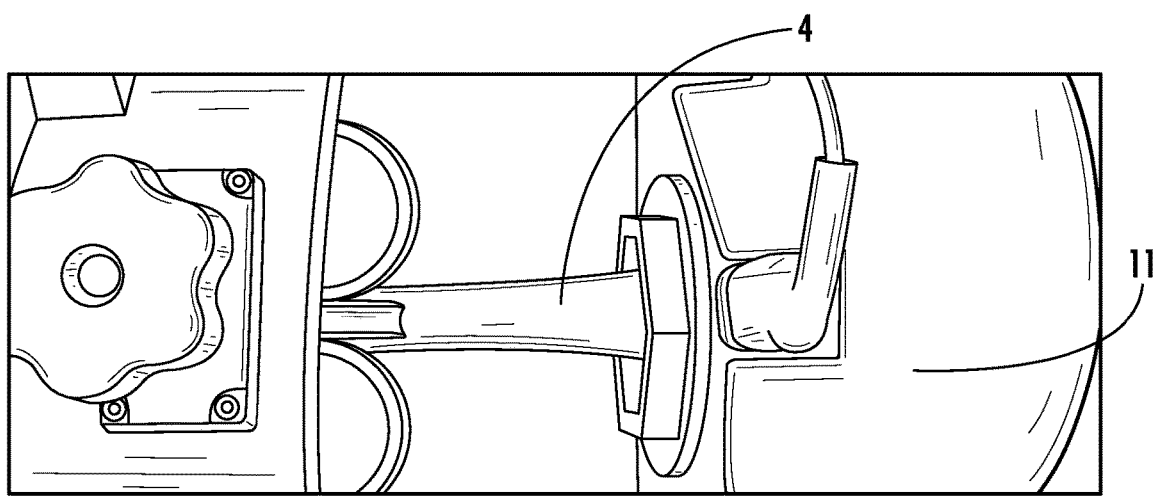
Figure 11:
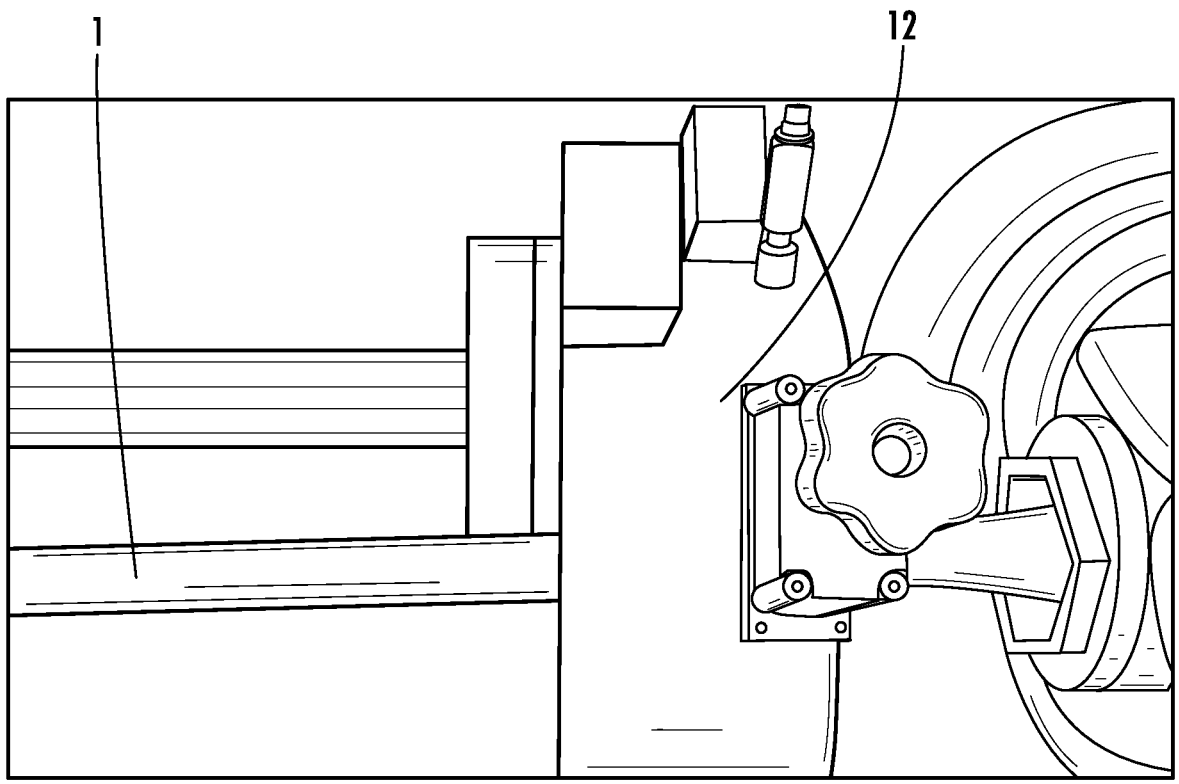
Figure 12:
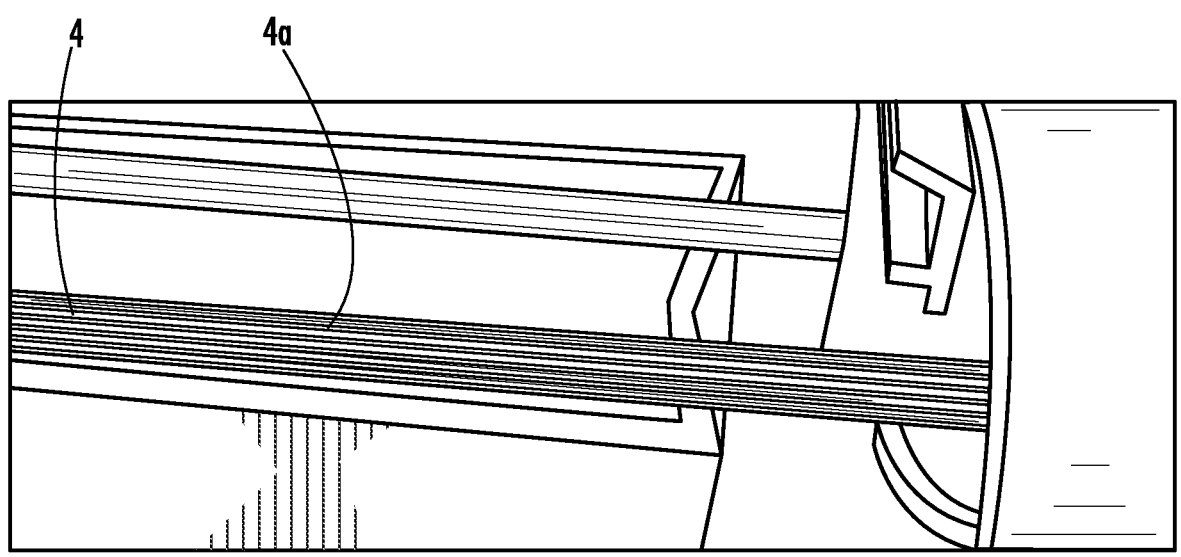

As shown for example in FIGS. 10 and 11, the method further includes the following steps, before or after the step of inserting the inner tube inside the insulating cover or applying the tubular insulating cover around the inner tube:
- providing a tubular protective jacket or a protective material suitable for making the protective jacket 4, and
- applying or obtaining the tubular jacket 4 around the tubular insulating cover 3, for example extruding the protective material in order to obtain a protective jacket 4 on and/or over and/or all around the insulating cover 3.

The latter step can be made for example by means of cross die extrusion 11 or with another suitable machine of the line 6, such as a machine suitable for obtaining a co-extrusion, possibly with glue.

Of course, if the tubular jacket 4 is applied or obtained around the tubular insulating cover 3 after the latter has been applied around the inner tube 2, the jacket 4 is applied or obtained around the tubular insulating cover 3 with the inner tube 2 therein.

Optionally, a layer of glue is supplied among the insulating cover 3 and the tubular jacket 4. This step can be carried out with a co-extruder suitable for extruding both the glue and the tubular jacket 4.

In this respect, a suitable extruder for the tubular jacket and, optionally for the glue can be used, for example a die extruder with cross head or another suitable extruder.

As an alternative, the jacket 4 can be obtained with a sheet shape and the same is coupled (with glue or not) with or abutted to a sheet of cover 3, and subsequently such coupled layers 3, 4 are folded so as to obtain a tubular cover with an outer tubular jacket, and the free ends of the tubular cover+jacket are fixed to one another by means of glue or welding.

Thus, in such case, the jacket 4 would not be applied or obtained on or around a tubular cover, but such components, cover 3 and jacket 4, would be rendered tubular starting from a sheet together and simultaneously.

In such case, if the cover 3 is made of two or more sheets 3a, 3b, then the sheet of jacket is coupled with the second sheet 3b of the cover designed to be the outer coater in the tubular cover 3, before or after the step of coupling the sheets 3a, 3b of the cover 3 to one another.

Moreover, as shown in FIG. 11, the method can comprise a step of knurling the protective jacket 4, which step can be carried out by a shaping machine 12 of the line 6, that comprises suitable tools for impressing or shaping the outer surface of the protective jacket 4.

Owing to this expedient, the outer surface of the protective jacket 4 can be provided with a knurled or waved or rough pattern or corrugations, or with other patterns or corrugations, such as a longitudinal pattern or corrugation 4a or with an annular rings pattern or corrugations.

Such a treatment of the protective jacket 4 could also be of help for improving the bond or constrain among the insulating cover 3 and the protective jacket 4.

As an alternative, the tube 2 and the cover 3 are obtained, with the cover 3 having no slit and with no cutter being arranged, and the tubular jacket 4 is applied around the cover 3 before the same is applied to the tube 2. At this stage, the tube 2 is inserted into the longitudinal opening of the tubular cover 3 coated with tubular jacket 4 and then the same are stuck together. In this case, specific expedients should be provided for ensuring a proper bonding of the tube 2 and the cover 3.

Even in this case, the inner tube 2 can be straightened and, optionally cut before being assembled with the other components of the pipe, and the same applies to the cover 3 with the jacket 4 applied thereon.

In this case, as it will be understood, the thermal insulation is improved owing to the fact that no slit is arranged and subsequently closed.

However, a method as previously described (with a cover delimiting a slit for the inner tube insertion) makes it possible to obtain pipes longer than the now recalled second alternative, since when an inner tube 2 is inserted into an insulating cover 3 as in the latter case, the tube 2 is subjected to a stress higher than the case with the cover delimiting a slit.

Moreover, the first method described for inserting the inner tube 2 in an insulating cover 3 ensures an improved adhesion among such layers.

Figure 13:
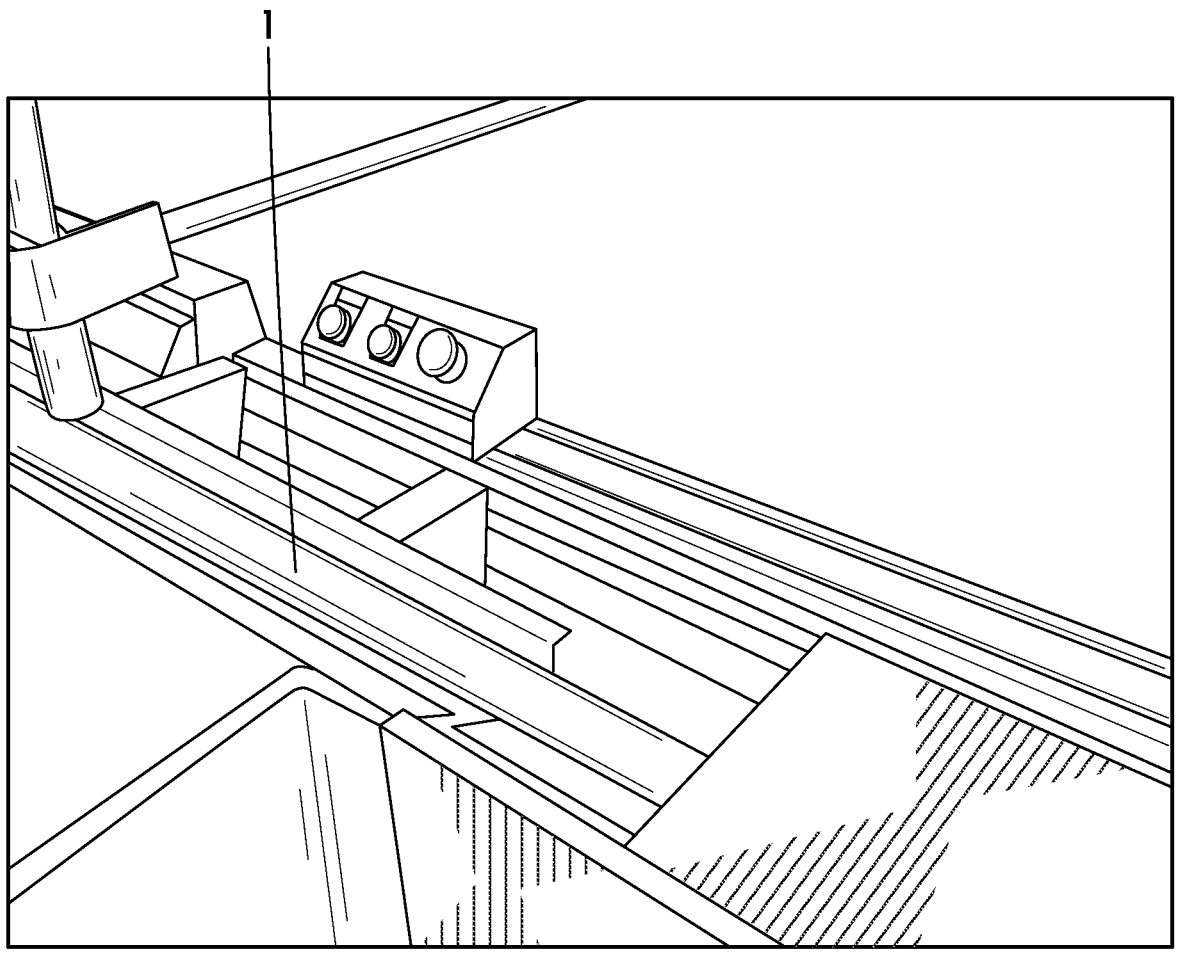

After the pipe 1 has been obtained with one of the above indicated methods, i.e. all its layers and/or coatings have been applied or formed, some further steps can be provided:

cooling the pipe 1 (as shown in FIG. 13) and/or the protective jacket 4 and/or the insulating cover 3 and/or the optional intermediate layer 5, and/or marking the pipe with any suitable marking.

So far as the marking step of the jacket 4 is concerned, as an alternative, the same can be made before the assembling step of the inner tube 2 (on the one side) with the cover 3 plus the jacket 4 (on the other side).

Of course, at the end of the method the pipe 1 can be cut in pieces to a predetermined length, for example of 10 ft up to 200 ft, and it can be wound in a reel and then packaged.

On the base of the above-mentioned alternatives, a number of preferred embodiments of methods according to the present invention, which the inventors experimented to provide the best performance, can be listed.

According to a first preferred embodiment, an inner tube made of a material as above indicated is obtained and optionally straightened.

Moreover, a first insulating foam cover sheet without jacket is provided, such sheet is preferably slitted and then the thus-obtained insulating foam strip/s is/are optionally coiled and then uncoiled, thereby obtaining a first layer or layers of insulating cover inner layer.

The term "slitted" refers to an industrial process that transforms a roll of flat product wrapped around a core (see for example the toilet paper type) into strips or swivels with width smaller than the initial roll.

Such layer is assembled with the inner tube for example folded around the latter, and the free ends of the (now tubular) first foam insulating layer are welded by hot air or glue. In this respect, a number of strips or swivels can be wrapped around the inner tube to be insulated, the strips or swivels being wrapped one adjacent to the other until the whole length of the inner tube is covered.

Before or after the steps now disclosed, a second insulating foam sheet without jacket is provided, such sheet is preferably slitted and then the thus-obtained insulating foam strip is optionally coiled and then uncoiled, thereby obtaining a second layer of insulating inner layer.

Such second layer (or the respective strips or swivels) is assembled with the inner tube provided with the first insulating layer, for example folded around the latter, and the free ends of the (now tubular) second foam insulating layer are welded, for example by hot air or glue.

At this time, the jacket is applied, for example by means of cross die extrusion plus optional co-extrusion with glue, which glue is a layer which goes between the insulating foam tube (cover) and the jacket.

Subsequently, a jacket knurling step can be made.

The thus obtained pipe can then be undergone other steps, such as cooling, marking, cutting, winding/coiling and/or packaging.

Referring now to a second preferred embodiment, the same is similar to the first, but the jacket is not applied or obtained after the inner tube has been provided with the insulating foam layers, whereas the jacket is instead obtained or applied or coupled directly in sheet form over the second insulating foam sheet.

When referring to third preferred embodiment, an inner tube made of a material as above indicated is obtained and optionally straightened.

Moreover, a first insulating foam sheet without jacket is provided, such sheet is preferably slitted and then the thus-obtained insulating foam strip/s is/are optionally coiled and then uncoiled, thereby obtaining a first layer or layers of insulating inner layer.

Such layer (or the respective strips or swivels) is folded in a tubular shape, and the free ends of the (now tubular) first foam insulating layer are welded by hot air or glue.

Before or after the steps now disclosed, a second insulating foam sheet without jacket is provided, such sheet is preferably slitted and then the thus-obtained insulating foam strip is optionally coiled and then uncoiled, thereby obtaining a second layer of insulating inner layer.

Such second layer (or the respective strips or swivels) is assembled with the first tubular insulating layer, for example folded around the latter, and the free ends of the (now tubular) second foam insulating layer are welded by hot air or glue, thereby obtaining a two-layers tubular insulating cover.

At this point, a longitudinally cut, for example through a suitable saw, of the tubular insulating layers is made, thereby defining a longitudinal through slit therein or obtaining the tubular insulating cover with a longitudinal through slit formed in the respective side wall.

Subsequently, the inner tube is inserted in the slit of the insulating cover and thus inside the longitudinal opening of the latter, and then the slit is closed by welding, for example by hot air or UV rays or by glue.

At this time, the jacket is applied by means of cross die extrusion plus optional co-extrusion with glue, which glue is a layer which goes between the insulating foam tube and the jacket.

Subsequently, a jacket knurling step is made.

The thus obtained pipe can then be undergone other steps, such as cooling, marking, cutting, winding/coiling and/or packaging.

So far as the fourth preferred embodiment, the same is similar to the third embodiment, but the jacket is not applied or obtained after the inner tube has been provided with the insulating foam layers, whereas the jacket is instead obtained or applied directly in sheet form over the second insulating foam sheet.

Referring now to the fifth preferred embodiment, it includes several steps in common with the third preferred embodiment, although the second insulating foam sheet is applied or coupled to the first insulating foam sheet and then such coupled layers or sheets are slitted and then the thus-obtained insulating foam strip/s is/are optionally coiled and then uncoiled, thereby obtaining coupled insulating layers.

Such layers are then folded in a tubular shape, and the free ends of the (now tubular) first+second foam insulating layers are bonded or welded by hot air or glue, thereby obtaining a two-layers tubular insulating cover.

As relates to the sixth preferred embodiment, the same is similar to the fifth, but the jacket is not applied or obtained after the inner tube has been provided with the insulating foam layers, whereas the jacket is instead obtained or applied directly in sheet form over the second insulating foam sheet, before the same is applied or coupled with the second insulating foam sheet.

Referring now to the seventh preferred embodiment, an inner tube made of a material as above indicated is obtained and optionally straightened.

Moreover, a first insulating foam sheet without jacket is provided, such sheet is preferably slitted and then the thus-obtained insulating foam strip is optionally coiled and then uncoiled, thereby obtaining a first layer of insulating inner layer.

Such layer (or the respective strips or swivels) is folded in a tubular shape, and the free ends of the (now tubular) first foam insulating layer are welded by hot air or glue.

Before or after the steps now disclosed, a second insulating foam sheet with jacket is provided, such sheet is preferably slitted and then the thus-obtained insulating foam strip/s is/are optionally coiled and then uncoiled, thereby obtaining a second layer of insulating inner layer.

Such second layer (or the respective strips or swivels) is assembled with the first tubular insulating layer, for example folded around the latter, and the free ends of the (now tubular) second foam insulating layer are welded by hot air or glue, thereby obtaining a two-layers tubular insulating cover with jacket.

Subsequently, the inner tube is inserted or stuck in the longitudinal opening of the latter, thereby coupling the inner tube to the insulating cover.

The thus obtained pipe can then be undergone other steps, such as cooling, marking, cutting, winding/coiling and/or packaging.

So far as the eighth preferred embodiment is concerned, it includes several steps in common with the seventh preferred embodiment, although the second insulating foam sheet with jacket applied thereon is bonded or coupled to the first insulating foam sheet and then such bonded or coupled layers or sheets are preferably slitted and then the thus-obtained insulating foam strip/s is/are optionally coiled and then uncoiled.

Subsequently the two-layers insulating cover is folded in a tubular shape, and the free ends of the (now tubular) insulating layer are welded by hot air or glue, and then the inner tube is coupled to such insulating cover by means of sticking or insertion.

According to a ninth preferred embodiment, an inner tube made of a material as above indicated is obtained and optionally straightened.

Moreover, a first insulating foam sheet with jacket is provided, such sheet is preferably slitted and then the thus-obtained insulating foam strip/s is/are optionally coiled and then uncoiled, thereby obtaining a first layer of insulating inner cover.

Such layer is assembled with the inner tube for example folded around the latter, and the free ends of the (now tubular) first foam insulating layer are welded by hot air or glue.

The thus obtained pipe can then be undergone other steps, such as cooling, marking, cutting, winding/coiling and/or packaging.

Referring now to a tenth preferred embodiment, the same is similar to the ninth, but the jacket is not applied or obtained on the first insulating layer, whereas the same is instead applied or obtained after the inner tube has been provided with the insulating foam layer.

According to an eleventh preferred embodiment, an inner tube made of a material as above indicated is obtained and optionally straightened.

Moreover, a first insulating cover foam sheet without jacket is provided, such sheet is preferably slitted and then the thus-obtained insulating foam strip/s is/are optionally coiled and then uncoiled, thereby obtaining a first layer of insulating inner layer, which is then folded and welded at their free ends for obtaining a first tubular layer.

At this time, the jacket is applied around the first tubular layer by cross die extrusion plus optional co-extrusion with glue, which glue is a layer which goes between the insulating foam tube and the jacket.

Subsequently, a jacket knurling step is made.

Then, the inner tube is inserted or stuck in the longitudinal opening of such tubular layers.

The thus obtained pipe can then be undergone other steps, such as cooling, marking, cutting, winding/coiling and/or packaging.

Referring now to a twelve preferred embodiment, the same is similar to the eleventh, but the jacket is applied or obtained on the first insulating layer, and thus the same is not applied or obtained after the inner tube has been provided with the insulating foam layer.

Subject-matter of present patent document is also the use of a pipe 1 as above described and optionally obtained for conveying fluids in HVACR systems as well as a HVACR system comprising one or more pipe 1 for conveying fluids, such as liquids or gases, for example air or in general a refrigerant.

As it will be appreciated, owing to the present invention, a new insulating pipe with improved insulation is provided, with can be equipped with an external coating that allows easy installation, and with layers effectively bonded to one another.

In this respect, owing in particular to the insulating cover 3 consisting or comprising of cross-linked polyethylene, it is possible to obtain insulation, resistance to hydrolysis and resistance to UV radiation improved with respect to the prior art pipe.

Moreover, thanks to the tubular jacket 4 made of at least one thermoplastic elastomer, optionally with ethylene-propylene-diene-monomer (EPDM), it is possible to obtain a good resistance to bending, even at very low temperatures, as well as good resistance to abrasion.

Furthermore, the specific materials of the insulating cover 3 and of the tubular jacket 4 demonstrated to synergistically cooperate in providing a resistant and flexible pipe with good insulation properties.

Modifications and variants of the invention can be implemented within the scope defined by the claims.

The invention claimed is:

1. A composite coating for an inner tube delimiting a passageway for a fluid for obtaining a pipe for conveying fluids in HVACR systems, wherein said composite coating comprises:
    a tubular insulating cover designed to cover or enclose an inner tube, wherein said tubular insulating cover is made of an insulation material, said insulation material comprising cross-linked polyethylene, and
    a tubular jacket coating said tubular insulating cover, wherein said tubular jacket is made of at least one compound selected from the group including thermoplastic elastomer, polyethylene (PE), polyvinyl chloride (PVC) or a mixture of elastomers and polymers, wherein said tubular insulating cover comprises two tubular layers or sheets applied one over or around the other, each layer or sheet having a thickness ranging among 5 and 15 mm, so that a final insulating cover has a whole thickness ranging among 10 and 30 mm.

2. The composite coating according to claim 1, wherein said tubular jacket is made of a mixture of at least one thermoplastic elastomer and of ethylene-propylene-diene-monomer (EPDM).

3. The composite coating according to claim 1, wherein no glue or adhesive is provided between said tubular jacket and said tubular insulating cover, and thus such layers are not constrained or connected or bonded to one another by glue or adhesive.

4. The composite coating according to claim 1, wherein said insulation material is a foam insulation material.

5. The composite coating according to claim 1, wherein said tubular jacket has a thickness ranging between 0.2 mm and 2 mm.

6. A pipe for conveying fluids in HVACR systems, comprising:
    an inner tube delimiting a passageway for a fluid, which inner tube is made of metal, such as copper, aluminium or a combination thereof, or is made of plastic or composite material, and
    a composite coating as claimed in claim 1, with said at least one tubular insulating cover covering or enclosing said inner tube.

* * * * *